(12) United States Patent
Wu

(10) Patent No.: US 7,077,535 B2
(45) Date of Patent: Jul. 18, 2006

(54) AUTOMOBILE INSTRUMENT PANEL LIGHTING STRUCTURE

(76) Inventor: Shih-Hsiung Wu, No. 406, Ding-Ann Street, An-Nan District, Tainan City (TW)

( * ) Notice: Subject to any disclaimer, the term of this patent is extended or adjusted under 35 U.S.C. 154(b) by 0 days.

(21) Appl. No.: 11/004,918

(22) Filed: Dec. 7, 2004

(65) Prior Publication Data

US 2006/0120062 A1 Jun. 8, 2006

(51) Int. Cl.
*F21V 101/00* (2006.01)
(52) U.S. Cl. .......................... 362/26; 362/489; 362/23; 362/30
(58) Field of Classification Search .................. 362/23, 362/29, 30, 26, 27, 555, 489; 368/67
See application file for complete search history.

(56) References Cited

U.S. PATENT DOCUMENTS

| 6,461,006 B1 * | 10/2002 | Matumoto | 362/27 |
| 6,848,799 B1 * | 2/2005 | Kālāntār | 362/23 |
| 6,959,995 B1 * | 11/2005 | Ikarashi et al. | 362/23 |

* cited by examiner

*Primary Examiner*—Laura Tso
(74) *Attorney, Agent, or Firm*—Rosenberg, Klein & Lee

(57) ABSTRACT

The present invention is an automobile instrument panel lighting structure providing a gentle illuminant effect on the display card through a halo effect and illuminating the hand without having an external light-source, thereby facilitating a driver's reading when driving at the dark environment.

8 Claims, 8 Drawing Sheets

AUTOMOBILE INSTRUMENT PANEL LIGHTING STRUCTURE

BACKGROUND OF THE INVENTION (a) Field of the Invention

The present invention relates to an automobile instrument panel lighting structure and more particularly for providing a mild illumination to the instrument panel beneficial to driving in the low light environment.

(b) Description of the Prior Art

The instrument panel is an essential part of an automobile including a fuel indicator, a speedometer, a tachometer, and an odometer etc for providing valuable information to a driver.

Conventional instrument panels may be too dark to be read for driving in a low illuminating environment or may not be eye-friendly to the driver' eyes for light illuminating directly thereon, when having an auxiliary lighting system by using the automobile's electrical power.

Besides, hands on instruments usually do not provide enough illumination for reading in dark environment, although some of them coated with fluorescent coating for improvement.

SUMMARY OF THE INVENTION

The present invention is to provide an automobile instrument panel lighting structure including a casing, a light platform, a light-source guide plate, a display card, and a hand assembly.

The casing has a cylinder casing to form an inner space enclosing a drive unit.

The light platform has a plate with a spindle at the center, wherein the spindle is driven by a drive unit and surrounded by at least one illuminant element.

The light-source guide plate, is formed between the light platform and the display card, has a light guide plate sloping to the center, a cover surrounding the outer perimeter thereof with a skirt extending downward to an inner space of the casing. A chamber is formed between the cover and the light guide plate, and an opening is formed at the center corresponding to the illuminant element, thereby enabling light from the illuminant element passing the chamber to illuminate the surface of the light guide plate.

The display card has a card with marks and is illuminated by light from the light guide plate.

The hand assembly has a vertical rod, with a lower end connecting to the spindle of the light plate and an upper end connecting to a hand, a lid covering the top of the vertical rod, and a coating covering the bottom of the hand.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
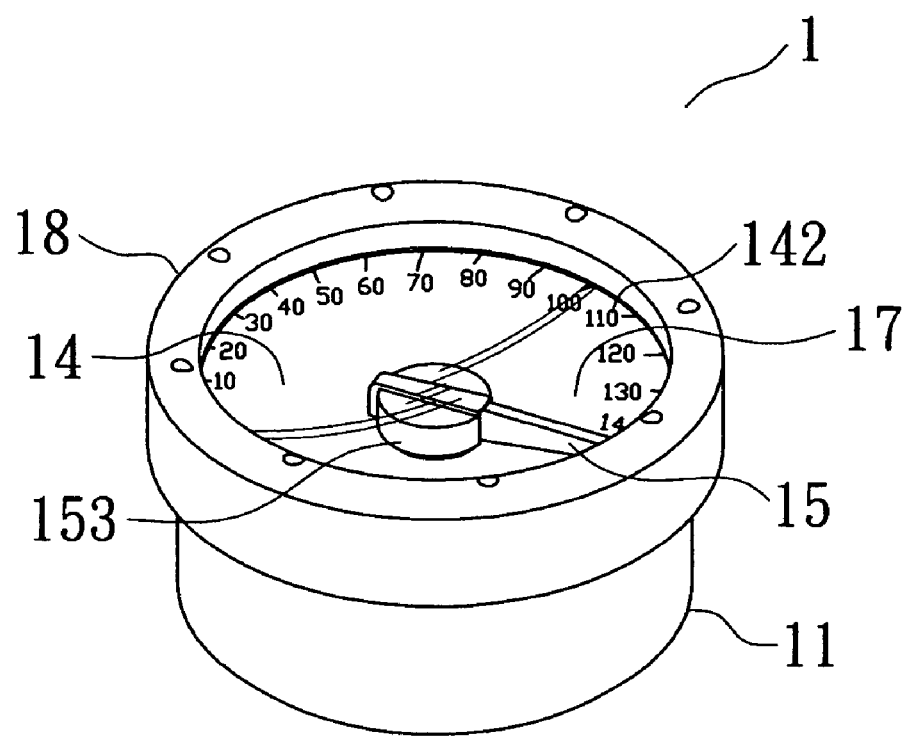
FIG. 1 shows a perspective view of the present invention.
Figure 2:
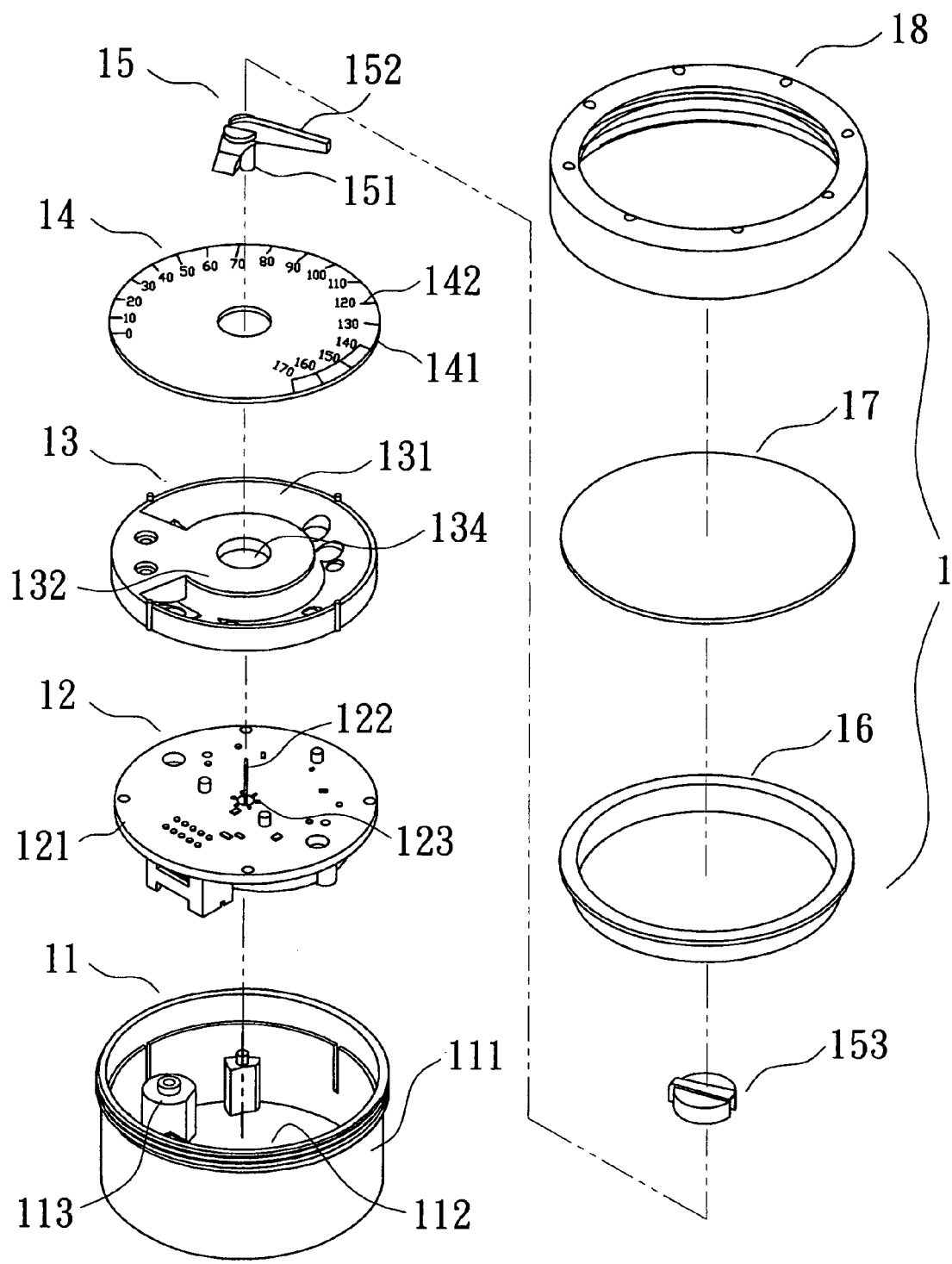
FIG. 2 shows an exploded elevational view of the present invention.
Figure 8:
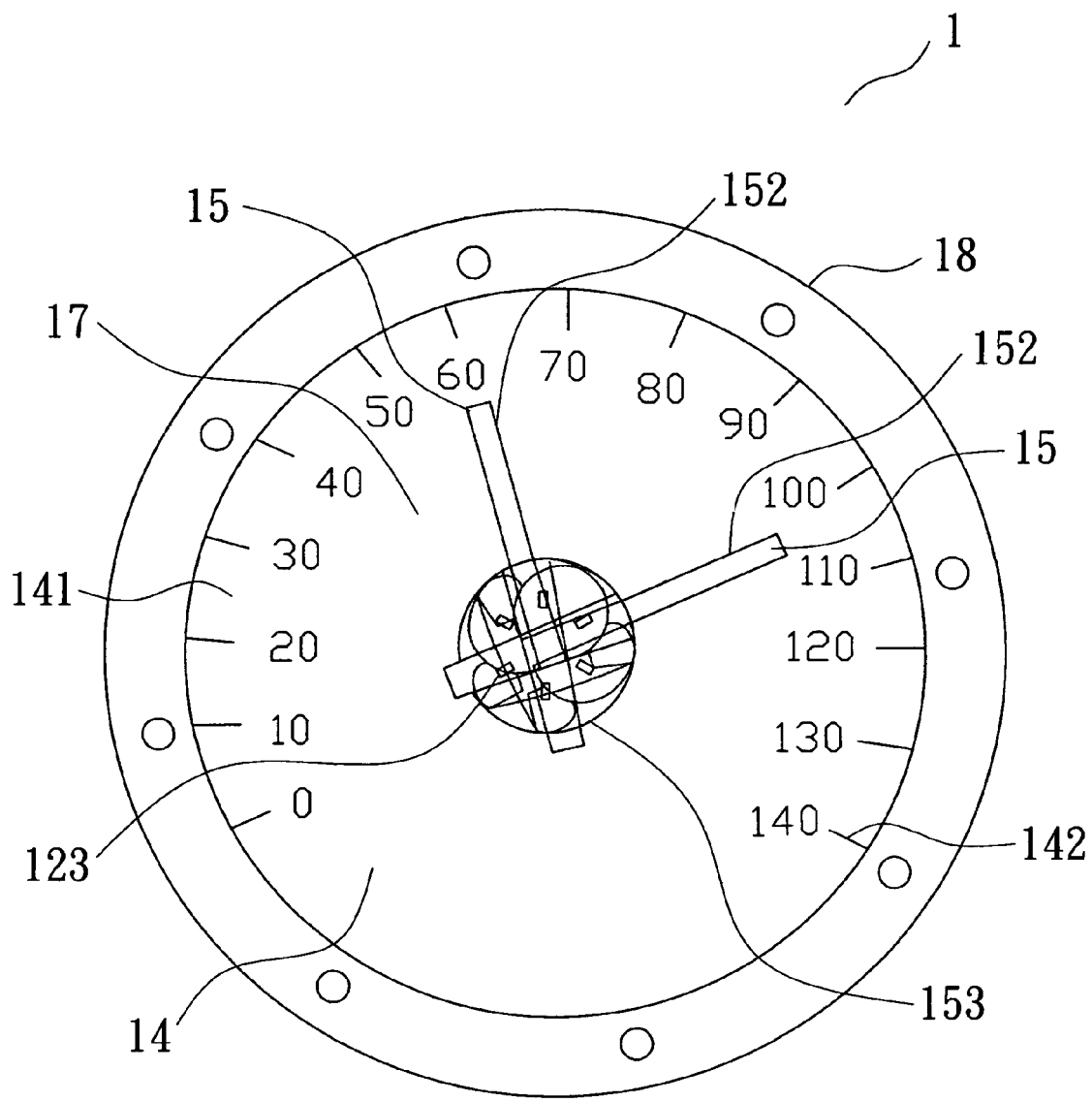
FIG. 8 shows a view of an illuminant element arrangement of the present invention.

Referring to FIGS. 1 and 2. The automobile instrument panel lighting structure 1 include is a casing 11, a light platform 12, a light-source guide plate 13, a display card 14, a hand assembly 15, an inner frame 16, a transparent cover 17, and an outer frame 18, wherein the casing 11 has a cylinder casing 111 to form an inner space 112 enclosing a drive unit 113, e.g. a stepper motor; the light platform 12 has a plate 121 with a spindle 122 at the center, wherein the spindle 122 is driven by a drive unit 113 and surrounded by at least one illuminant element 123, e.g. a diode, as shown in FIG. 8.

The light-source guide plate 13, is formed between the light platform 12 and the display card 14, has a light guide plate 131 with arced or sloped surface sloping to the center, a cover 132 surrounding the outer perimeter thereof with a skirt extending to the inner space 112. A chamber 133 is formed between the cover 132 and the light guide plate 131, and an opening 134 is formed at the center corresponding to the illuminant element 123, thereby enabling light from the illuminant element 123 passing the chamber 133 to illuminate the surface of the light guide plate 131, as shown in FIG. 3.

Figure 3:
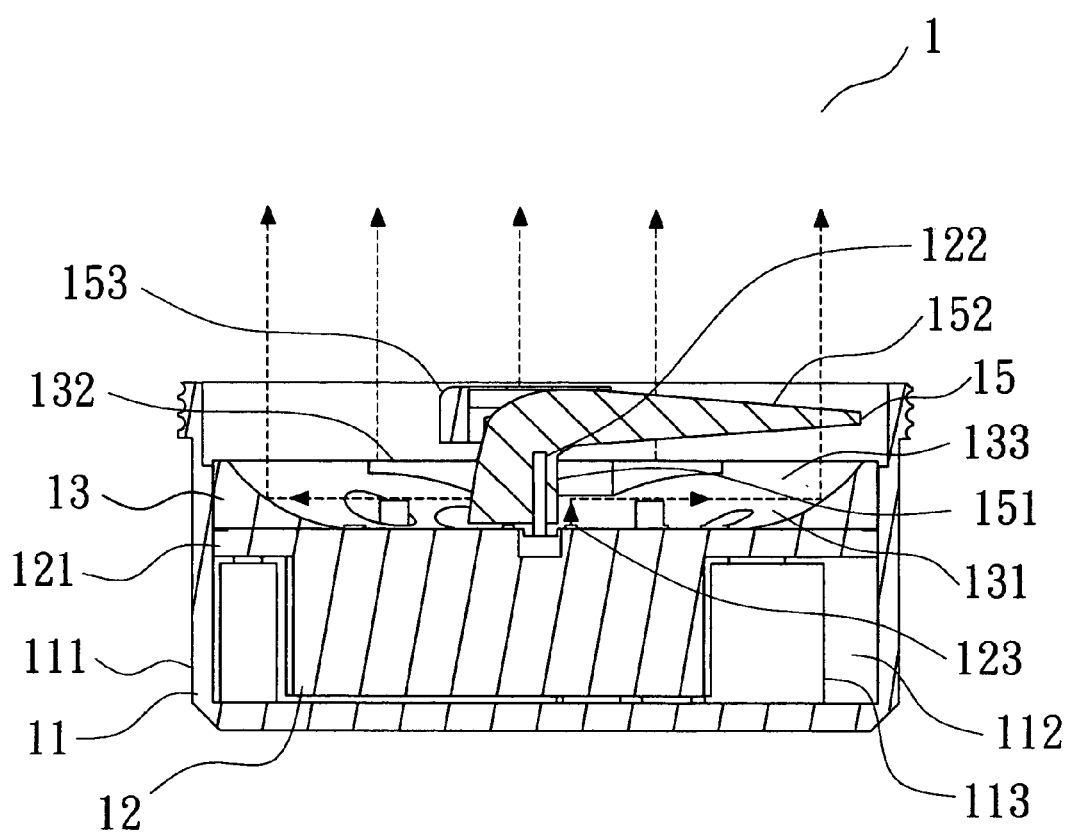
FIG. 3 shows a cross sectional view of an illuminated light-source guide plate of the present invention.
Figure 4:
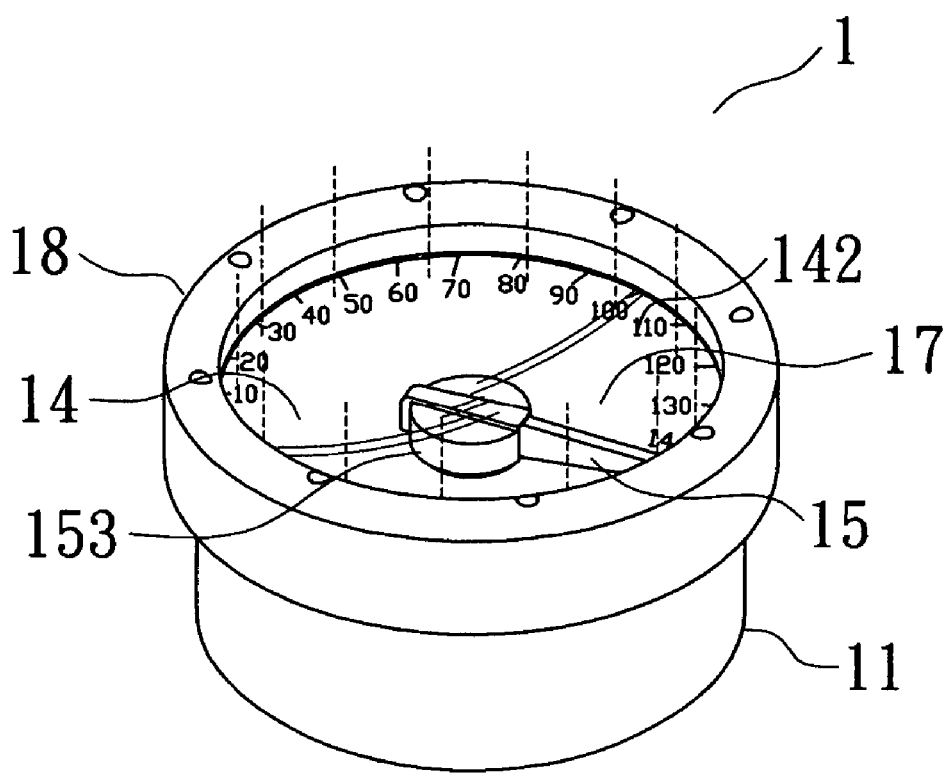
FIG. 4 shows a view of an illuminated display card of the present invention.

The display card 14 has a card 141 with marks 142 and being illuminated by light from the light guide plate 131, as shown in FIGS. 3 and 4.

Figure 5:
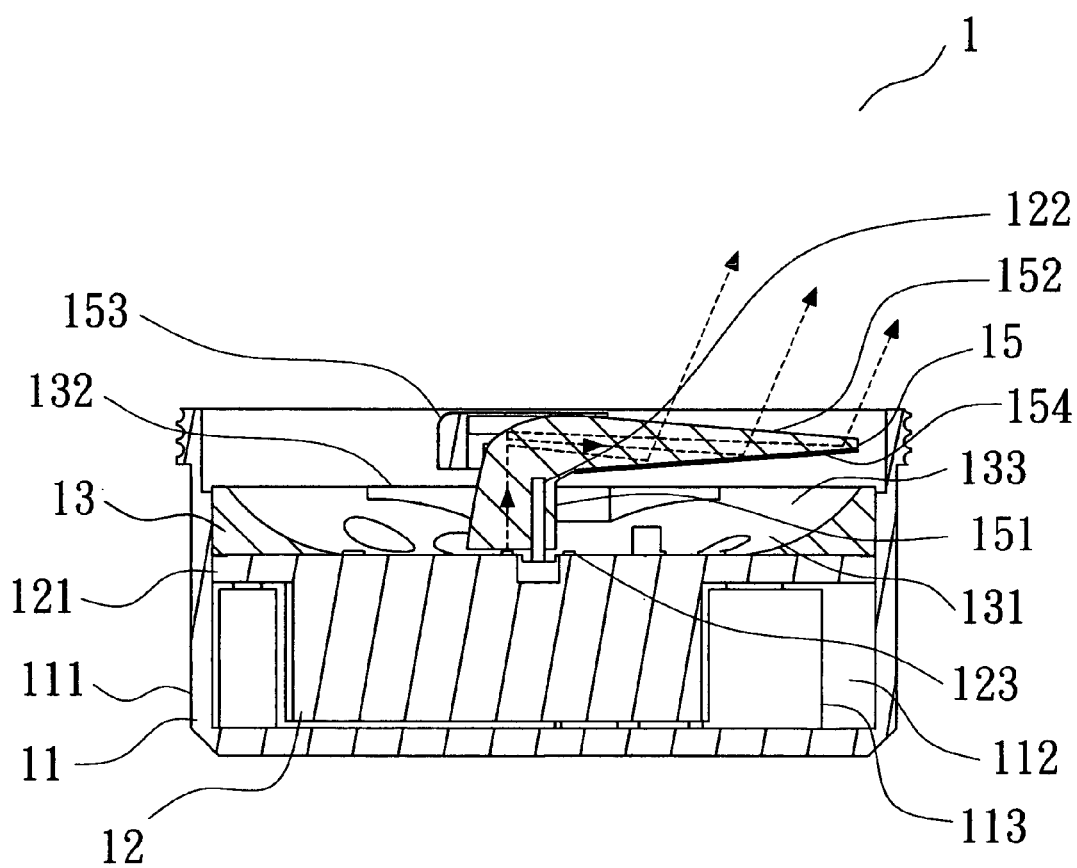
FIG. 5 shows a cross sectional view of an illuminated light-source guide plate of the present invention.
Figure 6:
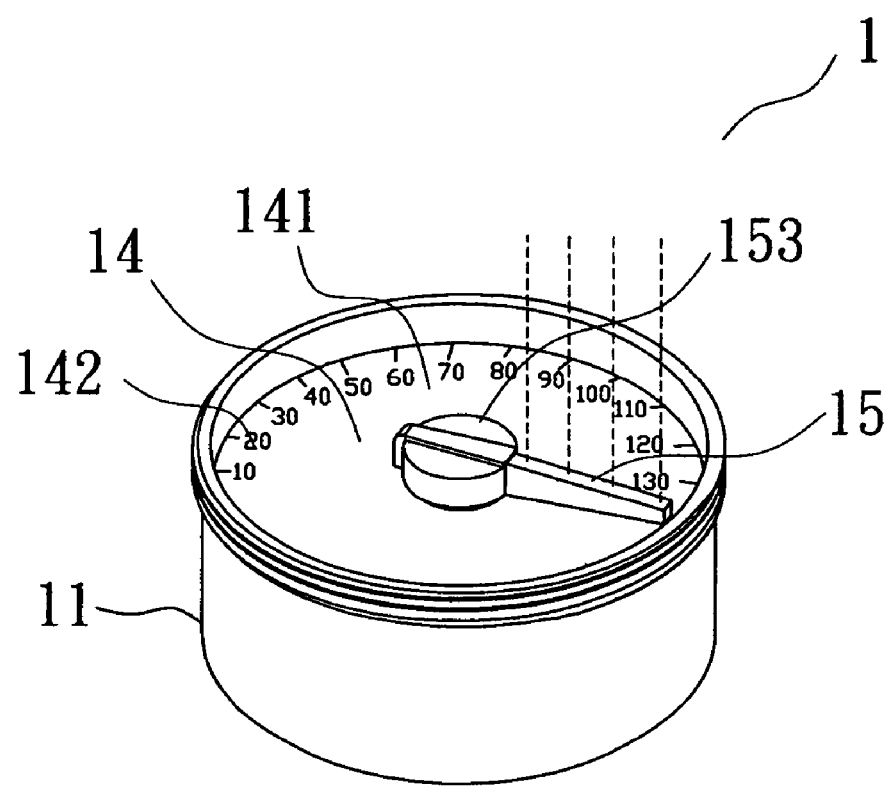
FIG. 6 shows another view of an illuminated hand assembly of the present invention.
Figure 7:
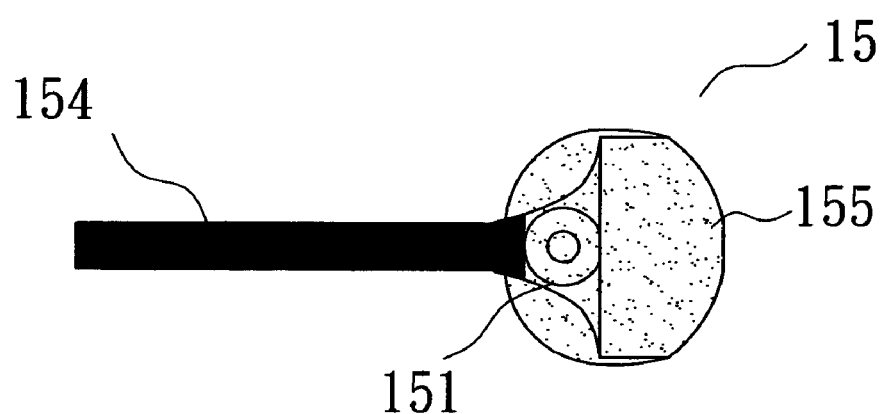
FIG. 7 shows a view of a weight-balance body on a hand and a coating covering the hand's bottom of the present invention.

The hand assembly 15 has a vertical rod 151, with the lower end connecting to the spindle 122 of the light plate 12 and the upper end connecting to a hand 152, a lid 153 covering the top of the vertical rod 151 enabling light, emitting from the illuminant element 123, to be reflected to illuminate the hand 152, a coating 154 of low light-penetration rate, e.g. a painting, covering the bottom of the hand 152 to prevent light loss, and a weight-balance body 155 formed on an end of the hand 152 to balance the moment generating from the other end thereof, as shown in FIGS. 5 to 7.

The inner frame 16 is formed around the outer perimeter of the display card 14; the transparent cover 17 is covered on the display card 14 to protect thereof; and the outer frame 18 framing the transparent cover 17.

The present invention has the following characteristics:
1. Enabling light from the illuminant element 123 passing the chamber 133 to illuminate the surface of the light guide plate 131 through a halo effect, thereby generating to a gentle illuminant effect on the display card 14 to facilitating reading, as shown in FIGS. 3 and 4.
2. Enabling light emitting from the illuminant element 123 to be reflected, by the lid 153 covering the top of the vertical rod 151, to illuminate the hand 152, which can be further enhanced by a coating 154 of low light-penetration rate, e.g. a thin plate or a painting, covering the bottom of the hand 152 to prevent light loss, thereby facilitating reading effect.

It is of course to be understood that the embodiment described herein is merely illustrative of the principles of the invention and that a wide variety of modifications thereto may be effected by persons skilled in the art without departing from the spirit and scope of the invention as set forth in the following claims.

What is claimed is:

1. An automobile instrument panel lighting structure comprising a casing, a light platform, a light-source guide plate, a display card, and a hand assembly, wherein the casing having a cylinder casing to form an inner space enclosing a drive unit;

the light platform having a plate with a spindle at center, there of wherein the spindle driven by a drive unit and surrounded by at least one illuminant element;

the light-source guide plate, formed between the light platform and the display card, having a light guide plate with arced or sloped surface sloping to the center there of, a cover surrounding the outer perimeter thereof with a skirt extending to an inner space of the casing, a chamber formed between the cover and the light guide plate, and an opening formed at the center corresponding to the illuminant element, thereby enabling light from the illuminant element passing through the chamber to illuminate a surface of the light guide plate;

the display card having a card with marks and being illuminated by light from the light guide plate;

the hand assembly having a vertical rod, with a lower end connecting to a spindle of the light plate and an upper end connecting to a hand, a lid covering the top of the vertical rod, and a coating covering the bottom of the hand.

2. The automobile instrument panel lighting structure as recited in claim 1, wherein a weight-balance body formed on an end of the hand to balance the moment generating from the other end thereof.

3. The automobile instrument panel lighting structure as recited in claim 1, wherein the coating covering the bottom of the hand.

4. The automobile instrument panel lighting structure as recited in claim 1, wherein the coating being the painting with the low light penetration rate.

5. The automobile instrument panel lighting structure as recited in claim 1, wherein the light guide plate having an arced surface.

6. The automobile instrument panel lighting structure as recited in claim 1, wherein the light guide plate having a sloped surface.

7. The instrument panel lighting structure as recited in claim 1, wherein the drive unit being a stepper motor.

8. The automobile instrument panel lighting structure as recited in claim 1, wherein the illuminant element being a diode.

* * * * *